March 25, 1930.   J. C. SPENCER   1,752,118
AEROPLANE RUDDER BAR CONTROL
Filed March 12, 1929
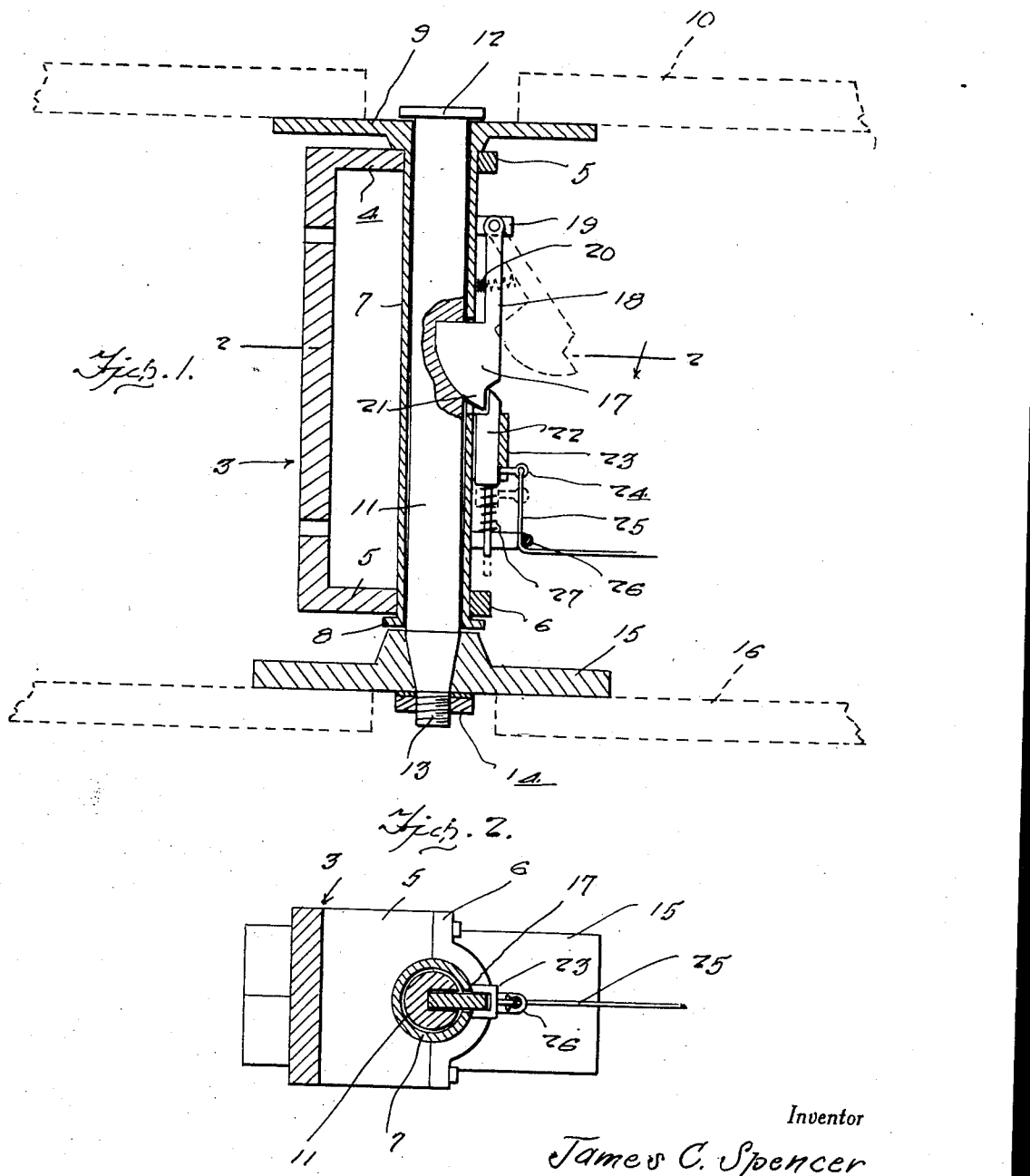
Inventor
James C. Spencer
By Clarence A. O'Brien
Attorney Patented Mar. 25, 1930

1,752,118

UNITED STATES PATENT OFFICE

JAMES C. SPENCER, OF CHICAGO, ILLINOIS

AEROPLANE-RUDDER-BAR CONTROL

Application filed March 12, 1929. Serial No. 346,362.

This invention relates to an improved aeronautical appliance and has more specific reference to a device which is particularly known as an aeroplane rudder bar controlling device.

More specifically stated, the invention has reference to a control device of this class which embodies an auxiliary bar located in a student's auxiliary control cockpit, and a main control bar located in the main or pilot's cockpit, together with a manually released clutch controlled operating connection between these bars.

Otherwise stated, the invention embodies two bars, a master and an auxiliary bar. The master bar is connected with the rudder and the pilot bar in the usual manner, and the auxiliary student's bar is connected with these parts through a locking device or operating connection which is under the control of the pilot and can be thrown out at the will of the pilot giving him free and independent control of the rudder, regardless of the position of the auxiliary bar in the student's or auxiliary control cockpit. This arrangement also gives the pilot control over the rudder, the same as if a single control were on the plane, and is so constructed as to render it substantially impossible to free the main controls and to make them inoperative.

The particular details and their relative association and arrangement for accomplishing this for safe and dependable results will become more readily apparent from the following description and drawings.

In the drawings:

Figure 1 is a view in section and elevation showing the clutch released operating connection between the main and auxiliary bars.

Figure 2 is a cross sectional view, taken approximately on the plane of the line 2—2 of Figure 1.

Referring to Figure 1, the reference character 3 designates an attaching bracket. This includes arms 4 and 5 at its opposite ends carrying detachable bearing caps 5 and 6, respectively. Thus, longitudinally spaced bearings are provided on the attaching bracket. Mounted for independent rotation and idling in these bearings is a tube or sleeve 7 having an outstanding flange 8, at one end, and an attaching head 9 at the opposite end.

The auxiliary student's control bar 10 is connected with this head. Mounted for rotation in this tube is the main control or operating shaft 11. This is provided with a flange 12, adjacent the head 9, and has its opposite end tapered, screw threaded as at 13, and provided with a retaining nut 14, for the head 15, to which the main control bar 16 is connected. These parts 7 and 11 may be simultaneously or independently actuated, depending on the circumstances. In order to cause them to operate in unison, I provide novel spring released clutch means. This comprises a coupling element or plate 17, extending through a slot in the sleeve and into a keeper socket in the shaft. This plate is mounted on one end of an arm 18, which is pivoted between the lugs 19 carried by the sleeve. An expansion spring 20 serves to automatically swing the clutch element from the full line position in Figure 1 to the dotted line position for permitting idling of the sleeve 7. It will be noted that the plate is provided with an extension nose 21, which forms a shoulder with which a similarly constructed extension or nose on a spring pressed latch 22 is engageable. This latch is mounted for sliding in the guide 23 on the sleeve. The latch carries an eye 24, to which a control cord 25 is connected. The control cord extends through a guide bracket 26, within convenient reach of the pilot. The reference character 27 merely designates a spring for moving the latch to retaining position.

Obviously, when the parts are in the full line position seen in Figure 1, the tube 7 and the shaft 11 are rotatable as a unit. Consequently, the rods 10 and 16 are simultaneously operable.

If conditions should require, the pilot in the main cockpit may temporarily throw the auxiliary control means out of play. This is done by pulling the cord 25 and disengaging the latch 22 from the clutch. The spring 20 thereby comes into play and swings the clutch outwardly, releasing the shaft from the tube and permitting independent operation of the shaft. Thus, the operating means for the rudder is within full control of the main pilot and may be manipulated at his more expert discretion.

It is thought that by considering the description in connection with the drawings, a clear understanding of the construction, operation and features of the invention will be had. Therefore, a more lengthy description is regarded as unnecessary.

Minor changes in the shape, size and rearrangement of details coming within the field of invention claimed may be resorted to, in actual practice, if desired.

I claim:

1. In a structure of the class described, in combination, an attaching bracket comprising bearings, a tubular shaft mounted for rotation in said bearings and provided at one end with a head, an auxiliary control bar connected with said head, a main shaft mounted for rotation in said tubular shaft provided at an opposite end with a head, a main control bar connected with said last named head, spring released clutch means for coupling said main and tubular shaft together for simultaneous operation, and a manually manipulated trip latch for cooperation with said clutch.

2. In a safety rudder bar for aeroplanes, in combination, a bracket provided with longitudinally spaced bearings, an auxiliary tubular shaft mounted for rotation in said bearings and provided at one end with a head, an auxiliary control bar connected with said head, a main shaft mounted for rotation in said auxiliary shaft provided at an opposite end with a head, a main control bar connected with said last named head, a spring pressed clutch plate mounted on said tubular shaft, said main shaft having a keeper recess for reception of said plate, and a manually released spring pressed latch for engaging said plate and holding the plate in coupling position, whereby to permit said shafts to be simultaneously or independently operated as conditions require.

In testimony whereof I affix my signature.

JAMES C. SPENCER.